United States Patent Office 2,970,048
Patented Jan. 31, 1961

2,970,048
DEFOLIATING COMPOSITION AND METHOD

Philip C. Hamm, Webster Groves, Mo., and Robert E. Miller, Kettering, Ohio, assignors to Monsanto Chemical Company, St. Louis, Mo., a corporation of Delaware No Drawing. Filed July 11, 1956, Ser. No. 597,074

2 Claims. (Cl. 71—2.5)

This invention relates to improvements in the method of defoliating deciduous plants, and more particularly to compositions which provide an effective premature dropping of leaves by growing plants.

It is well known that certain chemical compounds have the ability to defoliate plants. Although many compounds are sold for this purpose and are used to remove leaves which interfere with the harvesting of certain crops, particularly cotton and beans, they do not always provide a completely satisfactory result. Accordingly, the need for more effective defoliation agents is present and such compounds would provide a substantial improvement in the agricultural art.

The principal purpose of this invention is to provide a novel method for prematurely removing leaves from plants. A further purpose of this invention is to provide compositions, which will defoliate plants more effectively than compounds heretofore available. Further purposes of this invention will be evident from the following description of the invention.

The theory of defoliation is well known. Deciduous perennial plants have at the base of their leaves a layer of cells known as abscission cells, which in the normal metabolic process become enlarged and weakly bonded to the plant structure, whereby a fission between cell layers occurs, and the leaf becomes severed from the plant. This procedure may take place normally at the end of the growing season when the plant is becoming dormant, or it may take place in exceedingly dry weather where sufficient moisture is not available to enable the proper function of the entire leaf area of the plant. The artificial defoliation of plants is effected by applying compounds to the leaves which either directly or indirectly induce the normal growth of the abscission cells. The defoliation of plants is not a herbicidal action, and the dropping of the leaves, even where 100 percent defoliation is effected does not destroy the plant, the fruit continuing to grow and ripen after the defoliation has taken place. The removal of the foliage provides access of the fruit to the direct action of the sun thus accelerating the ripening and drying action if the harvesting of a dried crop is an objective.

The need or desirability of defoliation with respect to certain crops is well recognized. The laborious hand-picking of the bolls represents a substantial cost in the production of cotton. Although many machines have been constructed for picking cotton, the desired result is often not accomplished because of interference by the leaves. The machines for picking cotton will often remove leaves and the crushing of the leaves in the normal operation of the machine will frequently stain cotton so as to down-grade the product, or at least require a hand-sorting operation to remove leaves and to separate the stained cotton bolls. The artificial defoliation also enables the exposed fruit to ripen completely and more quickly through the action of the sun which was previously deprived of access to the fruit by the foliage. Thus the cotton may be harvested in a completely dry condition thus enabling a more efficient operation of the cotton-picking machines.

The defoliation is also useful in the harvesting of beans. Through the use of defoliants soy beans and other beans conventionally harvested in dry form may be machine picked to recover a high yield of ripened seeds without the usual interference of leaves. Other crops which use presently available defoliants may be effectively treated by the novel method herein described.

It has been discovered that certain types of organic compounds are useful in prematurely defoliating plants. The compounds which are exceptionally useful for this purpose are the organic compounds known as pentavalent nitrogen salts of hydroiodic acid derived from tertiary amines. These may be true quaternary ammonium iodides, tertiary ammonium hydroiodides or derived from heterocyclic tertiary amines. The useful compounds have in general the following structural formula:

wherein R, R', R'' and R''' are hydrogen or organic radicals having aliphatic carbon atoms adjacent the nitrogen atom, provided that not more than one of the R groups is hydrogen.

Several types of the defined compounds are useful in the practice of the invention, for example the quaternary ammonium iodides where each of the R, R', R'' and R''' substituent groups are separate organic radicals including alkyl, alkaryl, aryl, aralkyl, heterocyclic groups and mixed structural groups. The hydroiodides are also included, these being the compounds wherein one of the said substituent groups is hydrogen.

A very useful type is that wherein two of the said substituent groups are parts of the same organic radical, for example the iodide salts derived from cyclic tertiary amines such as pyridine, the pyridones, the picolines, the lutidines, the collidines and other substituted five or six member heteronitrogen ring containing compounds. This type of quaternary nitrogen compound is derived by the addition of an organic iodide, such as methyl iodide, benzyl iodide, cyclohexyl iodide, phenethyl iodide and homologues thereof to a hetero tertiary nitrogen containing ring compounds to form compounds of the type

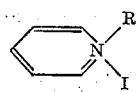

Another type of quaternary nitrogen compound is the tertiary ammonium hydroiodide derived from tertiary cyclic amines, such as pyridine, the pyridines, the picolines, the lutidines, the collidines, and the other five and six member ring compounds both substituted and unsubstituted, which tertiary amines react with hydroiodic acid to form salts of the type

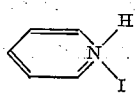

Another type of quaternary nitrogen compound, also a tertiary ammonium hydroiodide may be derived by the addition of an organic iodide, such as methyl iodide, benzyl iodide, cyclohexyl iodide, phenethyl iodide and homologous iodides, to cyclic secondary amines, such as piperidine, morpholine, other five or six member rings containing secondary amino groups and homologous amines to form compound of the type

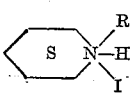

Obviously the secondary cyclic amine may have any organic radical substituted on the nitrogen atom and these tertiary amines may react by addition with any organic iodide to form quaternary ammonium iodides, or with hydroiodic acid to form tertiary ammonium hydroiodides.

The structures of the substituents on the quaternary nitrogen atom are not usually critical aspects of the invention provided that they do not contain hydrophobic substituents which render them water insoluble or provided that the substituents do not contain functions which produce phytotoxicity. However, there is one preferred class of quaternary nitrogen iodide which has particular efficacy in defoliating plants. These compounds are those which in addition to the non-phytotoxic water solubility properties contain a hydrazono molecular grouping such as

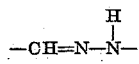

for example

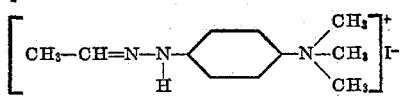

and

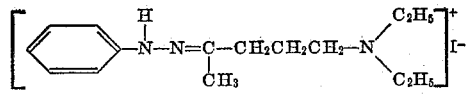

A wide variety of quaternary nitrogen iodides have been prepared and studied with respect to this defoliant activity and were found to be effective. Many other known compounds are of unquestionable utility as are also quaternary nitrogen iodides not yet prepared but for which structures can be drawn and methods of preparation are available through analogical reasoning from published synthesis records. Further examples of useful defoliant compounds are as follows:

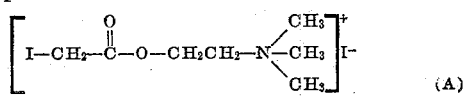

Iodoacetic acid β-dimethylaminoethyl ester methiodide

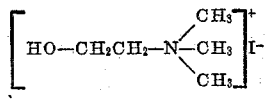

Choline iodide

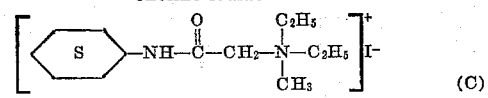

(Cyclohexylcarbamoylmethyl) diethylmethylammonium iodide

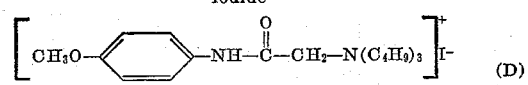

Tributyl (4-methoxyphenyl carbamoylmethyl) ammonium iodide

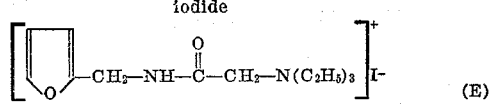

Triethylammonium furfurylcarbamoylmethyl iodide

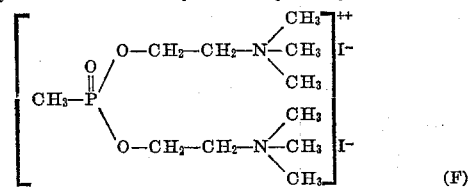

Bis(2-dimethylaminoethyl)methane phosphonate dimethiodide

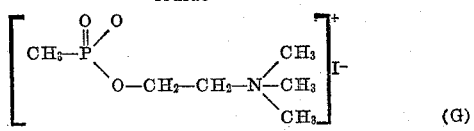

2-dimethylaminoethyl isopropyl methane phosphonate methiodide

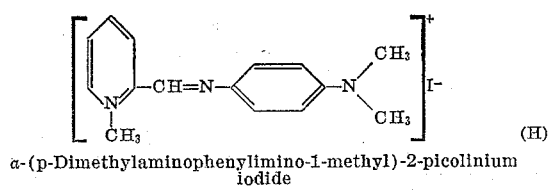

α-(p-Dimethylaminophenylimino-1-methyl)-2-picolinium iodide

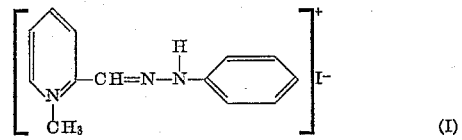

Pyridine-2-methanal methiodide phenylhydrazone

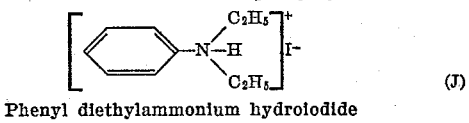

Phenyl diethylammonium hydroiodide

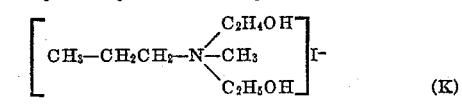

Diethanol n-propyl methyl ammonium iodide

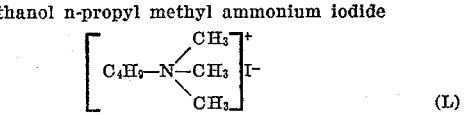

Butyltrimethylammonium iodide

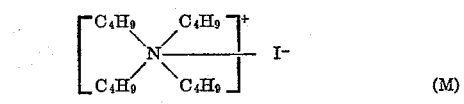

Tetrabutylammonium iodide

In the practice of this invention water solutions of the quaternary or tertiary ammonium iodides are prepared and sprayed on the plant which is to be defoliated. It has been found that the quantity applied to the plant may vary to some extent being dependent upon the leaf area and the wettability of the leaf surface. In general this will be approximately 0.1 to 20 pounds per acre, but preferred practice utilizes from 0.5 to 3.0 pounds per acre. The concentration of active ingredient in the solution or formulation will depend on tthe crop being defoliated, the concentration being selected so as to provide the desired quantity when the leaves are saturated to the drip point. It will be apparent that the concentrations which give the optimum result at lowest minimum cost are those which reach the drip point when the amount deposited on the leaf is the known quantity required to produce 100 percent defoliation, or the desired extent of defoliation. Obviously this will depend upon the wettability of the leaf and the ability of the leaf surface to retain the maximum quantity at the drip point.

In some cases the physical nature of the leaf surface is such as to make liquid spray operations unfeasible. In such cases dry pulverulent formulations may be used. This type of application generally requires formulation with suitable pulverulent materials which include the natural clays, such as china clays, the bentonites and the attapulgites; other minerals in natural state, such as talc, pyrophyllite, quartz, diatomaceous earh, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 90 percent by weight of the formulation applied to the plant. Here again the precise proportion to be used will depend upon the quantity of active component which will be retained on the leaf surface so as to provide an amount which will produce the optimum result. It has been found that the formulation must be such as to leave in contact with the leaf surface the quantity of active defoliant ingredient required to produce 100 percent defoliation or the extent of defoliation required or desired.

It has been found that defoliant formulations may include other aids or conditioning agents for producing maximum efficiency. These include wetting or dispersing agents, agents for adhering the active component to the leaf surfaces and aids for changing the physical characteristics of the leaf structure.

The conditioning agents which produce a wetting or dispersing agent may be used in both solid or liquid formulations. These include conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensates with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefitted by the incorporation of organic solvents for the active components, such as the water-immiscible organic alcohols, ketones and hydrocarbons, for example isopropanol, benzene, acetone, methylethyl ketone, kerosene and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil or plant surfaces.

Either the solid or the liquid formulations may include small quantites of natural or artificial polymers which may become viscous with the evaporation of the formulation of the vehicle or which in the case of solid compositions may become viscous liquids by hygroscopic action or by partial solution in water subsequently sprayed on the surface or by natural rainfall. Suitable agents of this type are the natural gums, for example gum arabic, gum tragacanth or gum acacia or they may be synthetic polymers such as carboxymethyl cellulose, alginic acid or salts, polyvinyl alcohol or the wholly synthetic polymers such as hydrolyzed polyacrylonitrile, any polymers of vinyl acetate and maleic anhydride or any of the other well known polymeric polyelectrolytes.

The solid formulations may be applied in the form of dust or they may be dispersed in a liquid vehicle, for example water in which they may be completely soluble or partially soluble but dispersed through the action of surface active components of the formulation. In many cases the water soluble components may have their solubility inhibited by the presence of known solvents in which case the aqueous formulation may exist as an emulsion, either soil in water or water in soil depending upon the quantity of hydrophilic or hydrophobic liquid vehicle present. In general the nature of formulation is believed to be within the province of one skilled in the art.

Further details of the practice of this invention are set forth with respect to the following specific examples.

Bean plants were sprayed to the drip point with concentrations of quaternary ammonium iodides at concentrations varying from 0.1 to 1.0 percent of active component. The concentrations were computed on the basis of the number of pounds per acre of the active component. The following table identifies the quaternary ammonium iodide by an initial corresponding to the above description of useful compounds and includes the application rate and the percent defoliation observed.

Example 1

Using a concentration of reagent such that at the drip point 9 pounds per acre of active component had been applied:

| Compound | Percent Defoliation | Rate/Acre (Pounds) |
| --- | --- | --- |
| o-iodophenol | 0 | 9 |
| Choline chloride | 0 | 9 |
| E | 100 | 9 |

The above defoliation experiments demonstrate that quaternary iodides are effective defoliants whereas other iodo organic compounds and quaternary ammonium chlorides are ineffective.

Example 2

The following table demonstrates the defoliation observed when quaternary iodides applied at the rate of 4.5 pounds per acre.

| Compound | Percent Defoliation | Rate/Acre (Pounds) |
| --- | --- | --- |
| F | 100 | 4.5 |
| G | 100 | 4.5 |
| L | 100 | 4.5 |

Example 3

Using the following quaternary iodides at the rate of 3.6 pounds per acre:

| Compound | Percent Defoliation | Rate/Acre (Pounds) |
| --- | --- | --- |
| A | 100 | 3.6 |
| B | 100 | 3.6 |
| Methyl iodide | 0 | 3.6 |
| D | 100 | 3.6 |
| E | 95 | 3.6 |

The above table of data demonstrates that quaternary salts have effective defoliation use, however, other organic iodide compounds, for example methyl iodide are totally without defoliation effect.

Example 4

The following compounds were applied at the concentration of 1.8 pounds per acre using the procedure described in Example 1.

| Compound | Percent Defoliation | Rate/Acre (Pounds) |
| --- | --- | --- |
| I | 100 | 1.8 |
| M | 100 | 1.8 |

Example 5

Using an application rate of 0.9 pound per acre and the procedure described in Example 1 above the following defoliation observations were made.

| Compound | Percent Defoliation | Rate/Acre (Pounds) |
| --- | --- | --- |
| A | 95 | 0.9 |
| B | 100 | 0.9 |
| C | 60 | 0.9 |
| D | 30 | 0.9 |

The scope of the invention is set forth with respect to the following claims.

What is claimed is:

1. A method of defoliating plants which comprises applying to the leaves of the plant having a crop nearing maturity, from 0.1 to 20 pounds per acre of pyridine-2-methanal methiodide phenylhydrazone, the application being in an amount such as to induce defoliation.

2. A formulation for defoliating plants which comprises pyridine-2-methanal methiodide phenylhydrazone in an effective defoliating amount, and adjuvants comprising a free-flowing solid diluent, a surface active agent and an organic solvent for the said iodide.

References Cited in the file of this patent

UNITED STATES PATENTS

| | | |
|---|---|---|
| 2,541,248 | Hibbs | Feb. 13, 1951 |
| 2,689,789 | Mowry et al. | Sept. 21, 1954 |
| 2,703,751 | Sharp | Mar. 8, 1955 |
| 2,726,149 | Boyd | Dec. 6, 1955 |
| 2,734,815 | Mowry et al. | Feb. 14, 1956 |
| 2,742,463 | Finkelstein | Apr. 17, 1956 |
| 2,751,713 | Abramitis | June 26, 1956 |